United States Patent
Amaya et al.

(10) Patent No.: US 10,525,530 B2
(45) Date of Patent: Jan. 7, 2020

(54) THREE-DIMENSIONAL SHAPING APPARATUS

(71) Applicant: Matsuura Machinery Corporation, Fukui, Fukui (JP)

(72) Inventors: Kouichi Amaya, Fukui (JP); Toshihiko Kato, Fukui (JP); Tetsushi Midorikawa, Fukui (JP); Mitsuyoshi Yoshida, Fukui (JP); Kazuhiro Shimizu, Fukui (JP)

(73) Assignee: Matsuura Machinery Corp., Fukui, Fukui (JP)

( * ) Notice: Subject to any disclaimer, the term of this patent is extended or adjusted under 35 U.S.C. 154(b) by 0 days.

(21) Appl. No.: 16/046,529

(22) Filed: Jul. 26, 2018

(65) Prior Publication Data
US 2019/0070662 A1    Mar. 7, 2019

(30) Foreign Application Priority Data

Sep. 5, 2017   (JP) .................................. 2017-170283

(51) Int. Cl.
*B29C 64/153*   (2017.01)
*B22F 3/10*   (2006.01)
*B22F 3/105*   (2006.01)
*B33Y 10/00*   (2015.01)
(Continued)

(52) U.S. Cl.
CPC .......... *B22F 3/1007* (2013.01); *B22F 3/1055* (2013.01); *B29C 64/153* (2017.08); *B33Y 10/00* (2014.12); *B33Y 30/00* (2014.12); *B33Y 40/00* (2014.12); *B22F 2003/1059* (2013.01); *Y02P 10/295* (2015.11)

(58) Field of Classification Search
CPC ... B29C 64/214; B29C 64/241; B29C 37/006; B29C 64/30; B29C 64/364; B29C 64/371
USPC .................................................. 425/210, 815
See application file for complete search history.

(56) References Cited

U.S. PATENT DOCUMENTS

2016/0375491 A1*   12/2016   Swaminathan ......... B29C 64/20
                                                         419/53
2017/0259339 A1*   9/2017   Riva ...................... B33Y 10/00
(Continued)

FOREIGN PATENT DOCUMENTS

JP          63-82223 A        4/1988
JP          2016-532781 A    10/2016
JP          2016-216773 A    12/2016
(Continued)

*Primary Examiner* — Xiao S Zhao
*Assistant Examiner* — Asha A Thomas
(74) *Attorney, Agent, or Firm* — Richard M. Goldberg

(57) ABSTRACT

A three-dimensional shaping apparatus includes a shaping table 31, a squeegee 32, a sintering device, a cutting device, transport pathways 4 through which metal powder and fumes that have been discharged to the outer side of a shaping tank 1 after cutting with the cutting device, and metal powder that has been discharged to the outer side of a chamber 2 surrounding the shaping tank 1 without forming part of the laminated layer, are transported to a sifter 5 located at the top of a powder tank 6, and supply devices for inert gas that does not react with the metal powder at an inlet 40 of each transport pathway 4, so as to suppress oxidation of metal powder in the transport pathway for collected metal powder and fumes, and also dust explosion due to sudden oxidation of the same.

8 Claims, 2 Drawing Sheets

(51) Int. Cl.
*B33Y 40/00* (2015.01)
*B33Y 30/00* (2015.01)

(56) References Cited

U.S. PATENT DOCUMENTS

2017/0267554 A1* 9/2017 Joslin ...................... C23F 15/00
2017/0348771 A1* 12/2017 Kawada ................. B33Y 30/00

FOREIGN PATENT DOCUMENTS

| JP | 2017-7255 A | 1/2017 |
| JP | 2017-48408 A | 3/2017 |
| WO | 2015/005497 A1 | 1/2015 |

* cited by examiner

[Fig. 1]
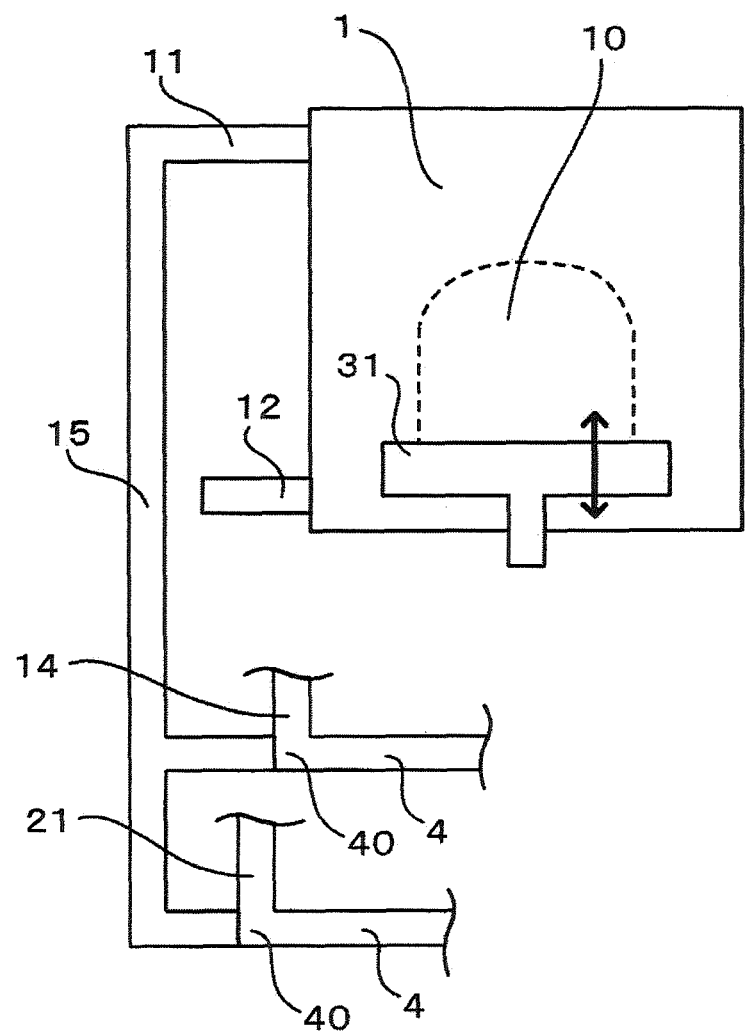

[Fig. 2]
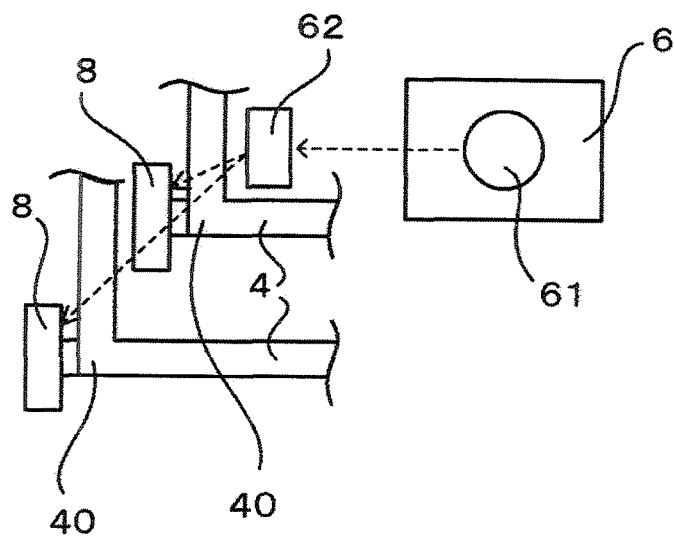
[Fig. 3]
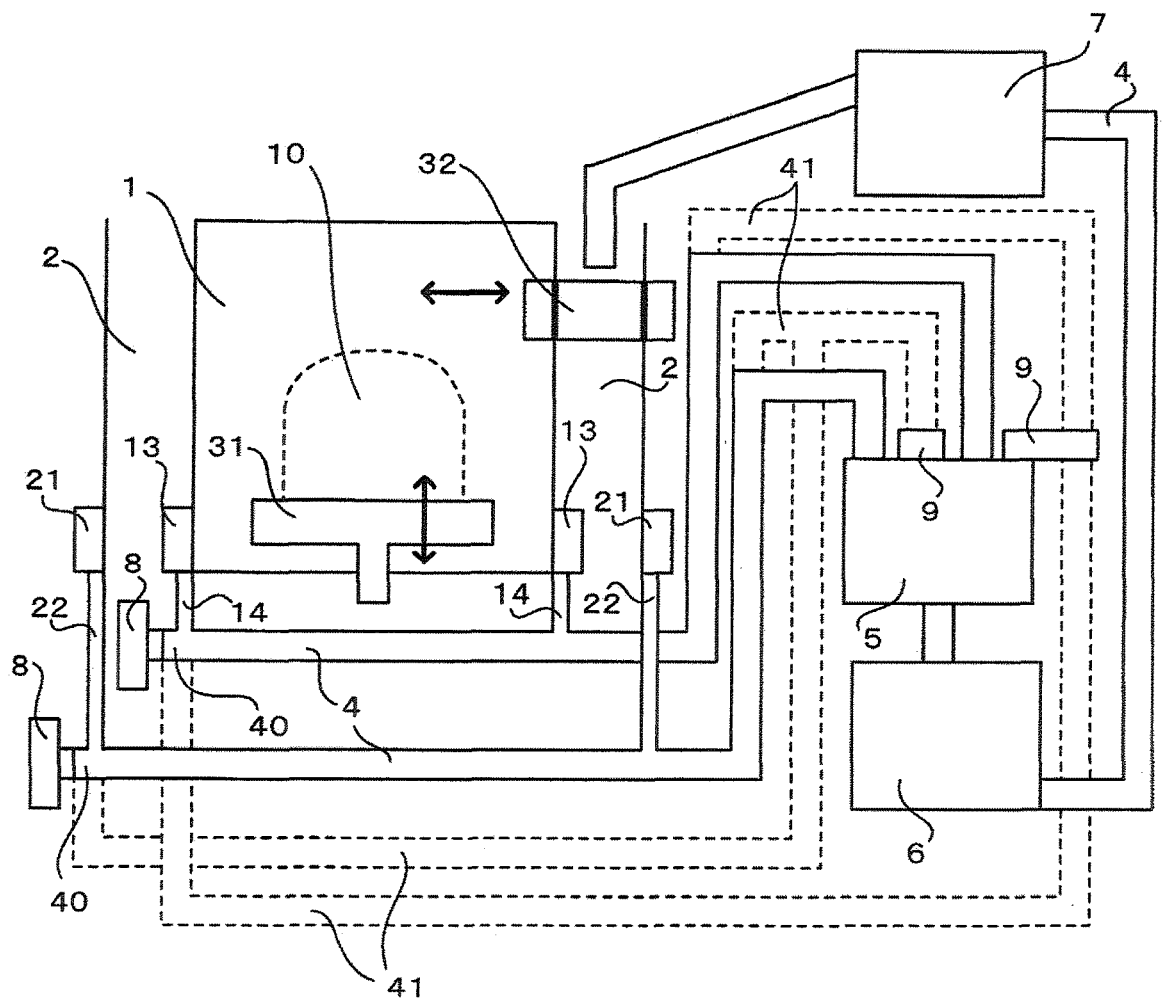

THREE-DIMENSIONAL SHAPING APPARATUS

TECHNICAL FIELD

The technical field of the present invention is that of a three-dimensional shaping apparatus that functions by the steps of lamination of metal powder by traveling of a squeegee, sintering by irradiation of a laser beam or electron beam, and cutting by rotation of a tool, the three-dimensional shaping apparatus being based on a basic construction whereby inert gas is supplied to the transport pathway for metal powder and fumes collected after shaping.

BACKGROUND ART

For a three-dimensional shaping apparatus which uses metal powder as material, lowering an oxygen concentration in a shaping tank and suppressing oxidation of the metal powder is a commonly known technique according to supplying an inert gas that does not react with the metal powder, such as nitrogen gas, neon gas or argon gas, into the shaping tank surrounding a shaping table that is vertically movable and supports an object to be shaped.

In such a three-dimensional shaping apparatus, reuse of the metal powder is also a well-known technique according to recovering the fumes and metal powder produced by cutting on the outside of the shaping tank surrounding the shaping table, and to discharging the non-laminating metal powder to the outer side of a chamber that is placed around the periphery of the shaping tank and surrounding the shaping tank and to storing it in a powder tank after passing through a sifter, further transporting it to a powder supply apparatus.

However, after the metal powder has been discharged from the shaping tank and chamber, the metal powder to be transported often oxidizes in the transport pathway before reaching the sifter, thereby results an obstacle against reuse of the metal powder.

Moreover, during transport of combustible metal powder such as titanium or aluminum, sudden oxidation of the metal powder can result in accidents such as dust explosion, with explosion being particularly likely to occur when the metal powder is located at the highest point of the transport pathway just before falling into the sifter, due to collision between the metal powder particles.

In the prior arts, however, no technical consideration has been given to suppressing oxidation of metal powder in the transport pathway for the fumes and metal powder collected from the shaping tank until they reach the sifter, or in the transport pathway for the metal powder collected from the chamber until it reaches the sifter.

For example, Patent Documents 1 and 2 disclose a construction for supplying nitrogen gas to a fume collector and recovering the nitrogen gas from the fume collector for reuse (see FIGS. 1 and 2, paragraph [0025] of Patent Document 1, and FIGS. 1 and 2, paragraph [0030] of Patent Document 2).

In regard to their construction, however, there is no disclosure or suggestion regarding supplying nitrogen gas in the fume transport pathway until it reaches the fume collector, nor furthermore is there any disclosure or suggestion regarding supplying nitrogen gas into the transport pathway for reuse of the metal powder.

PRIOR ART DOCUMENTS

Patent Documents

[Patent Document 1] Japanese Published Unexamined Patent Application No. 2016-216773

[Patent Document 2] Japanese Published Unexamined Patent Application No. 2017-48408

SUMMARY OF INVENTION

Problem to be Solved

It is an object of the present invention to provide a construction for a three-dimensional shaping apparatus that suppresses oxidation of metal powder in the transport pathway for collected metal powder and fumes, as well as dust explosion due to sudden oxidation of the same.

Means for Solving the Problem

In order to solve the aforementioned problem, the basic construction of the present invention is a three-dimensional shaping apparatus comprising a shaping table that is raised and lowered within a shaping tank, a squeegee that disperses metal powder by movement in the horizontal direction and forms a laminated layer from the metal powder, a sintering device that works based on irradiation of a laser beam or electron beam, and a cutting device that works by rotation of a tool, wherein the three-dimensional shaping apparatus is provided with transport pathways through which metal powder and fumes that have been discharged to an outer side of the shaping tank after cutting with the cutting device, and metal powder that has been discharged to an outer side of a chamber surrounding the shaping tank without forming part of the laminated layer, are transported to a sifter located at the top of a powder tank, and is further provided with supply devices for inert gas that does not react with the metal powder at an inlet of each transport pathway.

Advantageous Effects of Invention

According to the present invention which is based on this basic construction, it is possible to suppress oxidation within the transport pathway for collected metal powder, and also dust explosion due to its sudden oxidation, thereby achieving reuse of purified metal powder under safe conditions.

BRIEF DESCRIPTION OF DRAWINGS

FIG. 1 is a schematic diagram denoting the construction of Example 1.

FIG. 2 is a schematic diagram denoting the construction of Example 2.

FIG. 3 is a schematic diagram denoting the basic construction described above.

DESCRIPTION OF EMBODIMENTS

According to the basic construction, as denoted in FIG. 3, the metal powder and fumes that have passed through the cutting step are discharged to the outer side of the shaping tank 1, and metal powder that is not forming the laminated layer in the chamber 2 that is surrounding the shaping tank 1, is discharged to the outer side of the chamber 2.

The metal powder and fumes that have been discharged from the shaping tank 1 are thus collected by a collector 13, and fall down into the transport pathway 4 after having passed through a falling pipe 14.

Similarly, the metal powder that has been discharged from the chamber 2 is collected by the collector 21, and all of it falls down into the transport pathway 4 after having passed through a falling pipe 22.

The metal powder and fumes that have fallen down into the transport pathway 4, are separated by the sifter 5 after having passed through the transport pathway 4, and the metal powder alone is received into the shaping tank 1 and reused.

In this basic construction, as denoted in FIG. 3, supply devices for inert gas 8 are respectively provided at the inlet 40, i.e. the transport starting point, of each transport pathway 4.

The inert gas may be not only an inherently inert gas such as neon or argon, i.e. an inert gas in the strict sense, but also one that is an inert gas in the wider sense of not reacting with metals, such as nitrogen gas.

However nitrogen gas is used in almost all three-dimensional shaping apparatuses with consideration for economic cost.

Supplying such an inert gas suppresses oxidation of the metal powder either alone or in combination with fumes, in the transport pathway 4 until it reaches the sifter 5, achieving the purified metal powder to be reused.

Moreover, dust explosion due to sudden oxidation of combustible metal powder such as titanium and aluminum is also suppressed, achieving the metal powder to be reused under safe conditions.

Flow of gas is consequently indispensable for transport of the metal powder and fumes until reaching the sifter 5.

In order to elicit such a flow of gas, it is common to employ a construction in which a differential pressure is generated in the transport pathway 4, or a construction in which a state of flow is generated by a rotating screw.

In this basic construction, a compressor 8 that injects inert gas can be employed as the supply device for inert gas 8.

For this embodiment, the supply of inert gas and transport of the metal powder and fumes based on flow of the inert gas can be carried out all at once.

Instead of the embodiment by injection described above, transport of the metal powder and fumes in the transport pathway 4 can also be accomplished by a suction device 9 that operates in tandem with the supply device for inert gas 8, by generating negative pressure necessary for transport at the end location of the transport pathway 4 for the fumes and metal powder.

While using such the embodiment by suction in tandem with the embodiment by injection will achieve more reliable transport, if a larger degree of suction is set, it will be possible for transport to be carried out without tandem operation with the embodiment by injection.

The metal powder that has been separated by the sifter 5 and stored in the shaping tank 1 is transported to a powder supply apparatus 7 that supplies metal powder to the squeegee 32 via the other transport pathway 4.

As denoted in FIG. 3, in this basic construction, the transport pathway 4 for transport from the powder tank 6 to the powder supply apparatus 7 that supplies metal powder to the squeegee 32 is provided, and communication between the transport pathway 4 and the suction device 9 achieves all or a portion of the inert gas discharged from the suction device 9 to be supplied to the transport pathway 4.

By providing this additional transport pathway 4, the inert gas can be very efficiently reused.

As denoted by the dotted lines in FIG. 3, this basic construction may employ a feedback pathway 41 that returns and supplies all or a portion of the inert gas that has been discharged from the suction device 9 to the inlet 40 of the transport pathway 4 and/or the highest point of the transport pathway 4.

Although FIG. 3 denotes the feedback pathway 41 connected to both the inlet 40 of the transport pathway 4 and the highest point of the transport pathway 4, a feedback pathway 41 connected to only one of them may of course be used instead.

An embodiment that returns to the inlet 40 of each transport pathway 4 achieves efficient reuse of the inert gas, while an embodiment with feedback to the highest point makes it possible to efficiently suppress dust explosion by collision between the combustible metal powder particles at that location.

Examples of the present invention will now be described.

Example 1

For Example 1, as denoted in FIG. 1, the outlet 11 of the shaping tank 1 for inert gas that has been supplied into the shaping tank 1 communicates with the inlets 40 of each transport pathway 4, so that the shaping tank 1 corresponds to the supply device for inert gas 8.

According to this Example 1, inert gas that has been supplied into the chamber 2 is reused by the transport pathway 4 for metal powder and fumes that have been collected, achieving efficient reuse of the inert gas.

In the case of Example 1 described above, by providing the outlet 11 for inert gas at the top of the shaping tank 1 and the outlet 12 for oxygen at the bottom of the shaping tank 1, efficient separation of oxygen that has infiltrated into the shaping tank 1 may be achieved, and the inert gas discharged from the shaping tank 1 can be reused as highly concentrated inert gas.

Example 2

According to Example 2, as denoted in FIG. 2, an oxygen densitometer 61 is situated inside the powder tank 6, and a controller 62 is installed that adjusts the feed rate of the inert gas according to the oxygen concentration measured by the oxygen densitometer 61.

In this Example 2, the concentration of inert gas supplied to each transport pathway 4 can be adjusted according to the oxygen concentration in the shaping tank 1, and a suitable metal powder feed rate can be maintained.

Example 3

For Example 3, as denoted in FIG. 3, the pipes of metal forming each of the transport pathways 4 are grounded.

In this Example 3, by setting an electric potential of the grounded pipes to zero, electrification of the metal powder in each of the transport pathways 4 is prevented, achieving oxidation of the metal powder due to electrification to be further suppressed, while also achieving accidents such as explosion of metal powder dust to be suppressed.

INDUSTRIAL APPLICABILITY

According to the present invention, it is possible to reuse purified metal powder that has been discharged and collected from a shaping tank and chamber, in a state with suppressed oxidation, and the present invention is therefore applicable to three-dimensional shaping apparatuses having a wide range of structures.

REFERENCE SIGNS LIST

1: Shaping tank
10: Three-dimensional shaped product

11: Top outlet of shaping tank
12: Bottom outlet of shaping tank
13: Collector
14: Falling pipe
15: Pipe for communicating between inert gas outlet and transport pathway
2: Chamber
21: Collector
22: Falling pipe
31: Shaping table
32: Squeegee
4: Transport pathway
40: Inlet of transport pathway
41: Feedback pathway
5: Sifter
6: Powder tank
61: Oxygen densitometer
62: Controller
7: Powder supply apparatus
8: Supply device for inert gas and compressor
9: Suction device

The invention claimed is:

1. A three-dimensional shaping apparatus comprising:
a shaping table that is raised and lowered within a shaping tank,
a squeegee that disperses metal powder by movement in a horizontal direction and forms a laminated layer from the metal powder,
a sintering device for irradiating the laminated layer of metal powder with one of a laser beam and electron beam,
a cutting device for cutting a product formed by irradiated laminated layers, by rotation of a tool,
a chamber surrounding the shaping tank,
a discharge opening in the shaping tank for discharging metal powder and fumes,
a discharge opening in the chamber for discharging metal powder,
transport pathways through which metal powder and fumes that have been discharged from the shaping tank and are collected by a collector, and fall down into the transport pathways after having passed through a falling pipe, and metal powder that has been discharged from the chamber surrounding the shaping tank without forming part of the laminated layer and is collected by the collector, and falls down into the transport pathways after having passed through a falling pipe, are transported to a sifter located at the top of a powder tank,
one of the following:
a suction device for sucking only an inert gas not reacting with the metal powder at an end of each transport pathway operating in tandem with a supply device for the inert gas, or
both the suction device and a compressor for injecting the inert gas at an inlet of each transport pathway, and
a further transport pathway for transporting metal powder from the powder tank to a powder supply apparatus that supplies metal powder to the squeegee, and the further transport pathway is communicated with the suction device for achieving all or a portion of the inert gas discharged from the suction device to be supplied to the further transport pathway transporting the metal powder separated by the sifter to the powder supply apparatus.

2. The three-dimensional shaping apparatus according to claim 1, further comprising:
an oxygen densitometer situated inside the powder tank, and
a controller that adjusts a feed rate of the inert gas according to an oxygen concentration measured by the oxygen densitometer.

3. The three-dimensional shaping apparatus according to claim 1, wherein the transport pathways are formed by pipes of metal which are grounded.

4. The three-dimensional shaping apparatus according to claim 1, further comprising a feedback pathway that returns and supplies all or a portion of the inert gas that has been discharged from the suction device to one of:
the inlet of the transport pathway,
a highest point of the transport pathway, or
both the inlet of the transport pathway and the highest point of the transport pathway.

5. A three-dimensional shaping apparatus comprising:
a shaping table that is raised and lowered within a shaping tank,
a squeegee that disperses metal powder by movement in a horizontal direction and forms a laminated layer from the metal powder,
a sintering device for irradiating the laminated layer of metal powder with one of a laser beam and electron beam,
a cutting device for cutting a product formed by irradiated laminated layers, by rotation of a tool,
a chamber surrounding the shaping tank,
a discharge opening in the shaping tank for discharging metal powder and fumes,
a discharge opening in the chamber for discharging metal powder,
transport pathways through which metal powder and fumes that have been discharged from the shaping tank are collected by a collector, and fall down into the transport pathway after having passed through a falling pipe, and metal powder that has been discharged from the chamber surrounding the shaping tank without forming part of the laminated layer is collected by the collector, and falls down into the transport pathway after having passed through a falling pipe, are transported to a sifter located at the top of a powder tank,
one of the following:
a suction device for sucking only an inert gas not reacting with the metal powder at an end of each transport pathway operating in tandem with a supply device for the inert gas, or
both the suction device and a compressor for injecting the inert gas at an inlet of each transport pathway, and
wherein all or a portion of the inert gas that has been discharged from the suction device is returned and supplied to at least one of:
the inlet of the transport pathways,
the highest point of the transport pathways along a feedback pathway, or both
the inlet of the transport pathways and the highest point of the transport pathways along a feedback pathway transporting the metal powder separated by the sifter to the powder supply apparatus.

6. The three-dimensional shaping apparatus according to claim 5, further comprising:
an oxygen densitometer situated inside the powder tank, and a controller that adjusts a feed rate of the inert gas according to an oxygen concentration measured by the oxygen densitometer.

7. The three-dimensional shaping apparatus according to claim 5, wherein the transport pathways are formed by pipes of metal which are grounded.

8. The three-dimensional shaping apparatus according to claim 5, further comprising a feedback pathway that returns and supplies all or a portion of the inert gas that has been discharged from the suction device to one of:
- the inlet of the transport pathway,
- a highest point of the transport pathway, or
- both the inlet of the transport pathway and the highest point of the transport pathway.

\* \* \* \* \*